Figure 1:
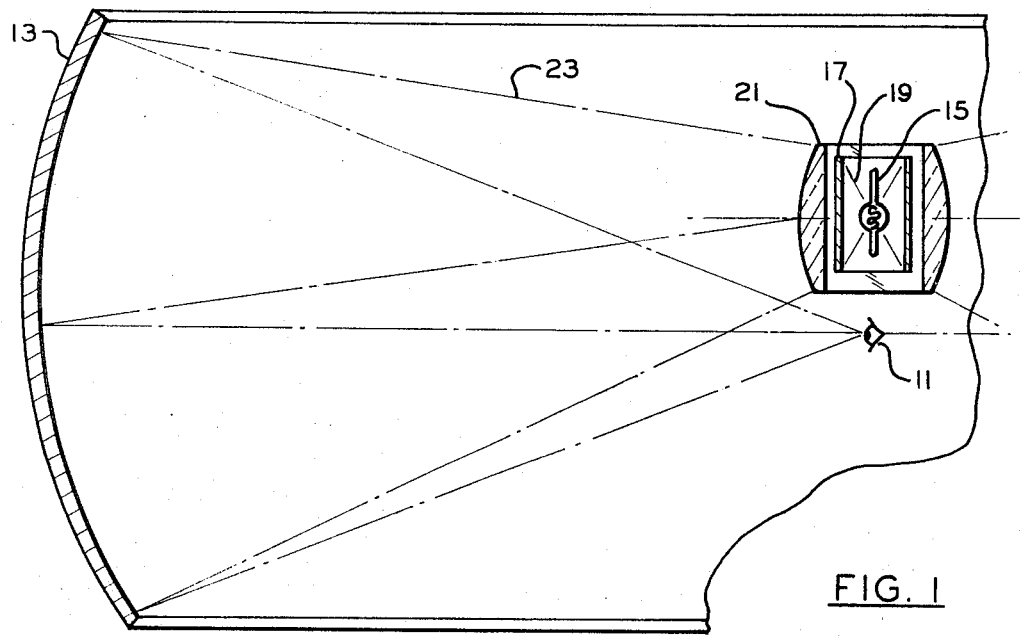

United States Patent
Mallinson et al.

[11] 3,850,516
[45] Nov. 26, 1974

[54] POINT LIGHT SOURCE SYSTEM

[75] Inventors: Richard B. Mallinson; Richard A. Mecklenborg, both of Binghamton, N.Y.

[73] Assignee: The Singer Company, New York, N.Y.

[22] Filed: Dec. 7, 1972

[21] Appl. No.: 313,023

Related U.S. Application Data

[63] Continuation of Ser. No. 113,161, Feb. 8, 1971, abandoned.

[52] U.S. Cl. ............... 353/122, 35/12 K, 35/12 N, 350/191, 350/198
[51] Int. Cl. ...... G03b 21/00, G09b 9/08, G02b 3/06
[58] Field of Search ............ 353/62, 79, 80, 81, 13, 353/95, 96, 97, 94, 102, 120, 122; 35/12 K, 12 N; 40/106.54; 350/191, 198

[56] References Cited
UNITED STATES PATENTS

| | | |
|---|---|---|
| 1,811,770 | 6/1931 | Wheeler .......................... 350/191 |
| 2,961,778 | 11/1960 | DeFlorez et al. .................. 35/12 K |
| 3,367,046 | 2/1968 | Newberger ......................... 35/12 |

FOREIGN PATENTS OR APPLICATIONS

| | | |
|---|---|---|
| 338,386 | 5/1904 | France ................................ 353/77 |

*Primary Examiner*—Louis R. Prince
*Assistant Examiner*—Steven L. Stephan
*Attorney, Agent, or Firm*—Jeffrey Rothenberg; James C. Kesterson

[57] ABSTRACT

An improved point light source visual system using a toric lens to concentrate the light from the point source and increase screen brightness. By proper positioning of the elements it is also possible to use a line of light rather than a point and further increase brightness.

3 Claims, 2 Drawing Figures

PATENTED NOV 26 1974　　　　　　　　3,850,516

INVENTOR.

BY

ATTORNEY

POINT LIGHT SOURCE SYSTEM

This is a continuation of application Ser. No. 113,161, filed Feb. 8, 1971, and now abandoned.

This invention relates to visual systems in general and more particularly to an improved point light source visual system.

Point light source visual systems are well known in the art. In general such a system comprises a source of light which is of as small a size as possible, a screen, and a transparancy with some cultural detail on it interposed between the source of light and the screen. Because the source is effectively a point it will faithfully reproduce the detail of the transparency on the screen without distortion.

Such systems have been used to provide simple visual systems for aircraft and helicopter simulators, driver trainers and the like. When used in such applications they usually have additional capabilities to simulate changes in some of the degrees of motion of the vehicle being simulated. Such a system is shown in U.S. Pat. No. 2,961,778 granted to L. DeFlorez et al. on Nov. 29, 1960.

One of the major deficiencies in the point light source system is the low level of illumination normally available to project the displayed image. Since the source must be kept as close to a point as possible, only a limited amount of light may be generated. In addition, light is emitted through 360° even though the field of view in use may be much less.

The present invention solves these problems with a system which allows light to be concentrated and a source which is not really a point but a line to be used by introducing a toric lens into the system.

It is the object of this invention to provide a point light source visual system having increased brightness.

Another object is to provide an improved visual system for use in simulators and trainers.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

Figure 2:
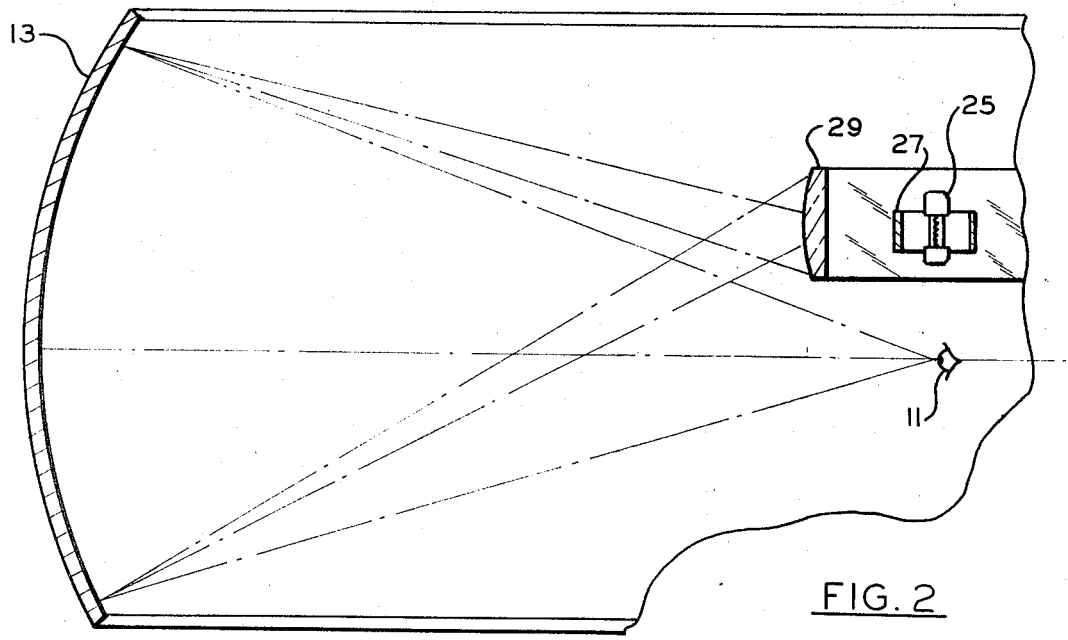

For a fuller understanding of the nature and objects of the invention reference should be had to the following detailed description taken in connection with the accompanying drawings, in which:

FIG. 1 is a fragmentary, side sectional view of a first embodiment of the invention; and FIG. 2 is a fragmentary, side sectional view of a second embodiment of the invention.

In the embodiments of FIGS. 1 and 2 a visual system of 360° horizontal field of view and less than 180° of vertical field of view is shown. That is, screen 13 is a segment of a sphere extending 360° in the horizontal direction. It may also be a section of a cylinder as is transparency 17 in FIG. 1 and transparency 27 in FIG. 2. The lenses 21 of FIG. 1 and 29 of FIG. 2 are toroids as their name implies. Of course, if less than 360° is required in the horizontal direction, each of the elements may be a section of a sphere, cylinder or toroid as the case may be. In the following explanation only the projection of rays in the plane of the figure will be considered. What occurs in this plane will be equally applicable for projections in any direction throughout the 360° (or less if a smaller horizontal field is required)

In the first illustrated embodiment of the invention, an observer's eyepoint 11 is at a position to view screen 13. Directly above eyepoint 11 is a point light source 15, for example an arc lamp. A transparency 17 is located in front of the source 15. Were this a standard point light source system it would be complete and the rays 19 from source 15 would continue to project outward. However, as shown, a toric lens 21 is placed in front of and in close proximity to the transparency 17. For optimum utilization of the light collecting properties of lens 21, transparency 17 would be placed as close thereto as convenient and could, in some applications, be in contact therewith. Lens 21 collects the light and projects rays 23 so that just the screen is covered. In the example shown divergence is reduced from about 100° to 40° and will result in almost a two and one half times increase in illumination.

If cultural detail is to be placed on transparency 17 it must be recorded to take into account the anamorphic distortion caused by lens 21. This can be easily done by making the transparency with the same type of system used for projection or alternatively by calculating the distortion using well known methods.

FIG. 2 shows a second embodiment of the invention. Eyepoint 11 and screen 13 are identical to FIG. 1. However the lamp 25 is no longer a point source but what may be called a line source. That is, it has vertical height but has no width in the horizontal direction. Transparency 27 is located between the lamp 25 and lens 29 at a distance such that the horizontal imagery on transparency 27 will be focused on screen 13. Such positioning can be done using well known optical techiques. Since the vertical line has effectively no width, the system will act the same as the one of FIG. 1 in the vertical direction. Thus this embodiment not only collects the light but allows a line of light which in turn makes an even brighter picture possible.

Motion may be simulated using methods well known in the art. The displacement between the light source and the pilot's eye must of course be considered when introducing such motion. This problem and a method of solving it is disclosed in application Ser. No. 75,657 filed by R. A. McKnight on Sept. 28, 1970 and assigned to the same assignee as the present invention. The embodiment of FIG. 1 may use any of the methods shown in the above referenced application, the DeFlorez patent previously mentioned or other standard methods to simulate motion. The embodiment of FIG. 2, however, because of the relationship between source 25, transparency 27 and lens 29 requires that motion be simulated by moving these elements together without disturbing their relationship with each other.

Thus, an improved point light source system which will produce increased brightness in applications where only a limited vertical field of view is required has been disclosed. Although the system has been disclosed for use in simulators and trainers it is equally applicable wherever point light source systems of limited vertical field of view are used.

What is claimed is:

1. Visual display apparatus for presenting a scene for viewing from an eyepoint located within predetermined boundaries, said apparatus comprising:

a light source having a width approaching zero;

a curved projection screen at least partially encircling said light source and suitable for displaying information, said screen subtending a horizontal angle of substantially 360°;

a curved transparency containing information suitable for display on said projection screen which transparency at least partially encircles said light source and is located between said light source and said projection screen; and a curved lens having substantially a toroidal shape with a horizontal circumference of substantially 360° located between said screen and said transparency and which at least partially encircles said transparency and said light source whereby light from said source is modulated by information on said transparency and is projected on said screen to provide a panoramic display of said information.

2. The invention according to claim 1 wherein said light source is a line light source concentric and parallel to the axis of said toroidal shaped lens.

3. Visual display apparatus for presenting a scene for viewing from an eyepoint located within predetermined boundaries, said apparatus comprising:

a line light source having a width approaching zero;

a curved projection screen suitable for displaying information on said screen having the shape of a segment of a sphere subtending a vertical angle of less than 180° and a horizontal angle of substantially 360°;

a substantially cylindrically shaped transparency which encircles said light source and contains information suitable for display on said projection screen; and a toroidal shaped lens located between said transparency and said screen and which encircles said transparency whereby light from said source modulated by information on said transparency is projected on said screen to provide a panoramic display of said information.

* * * * *